Figure 1:
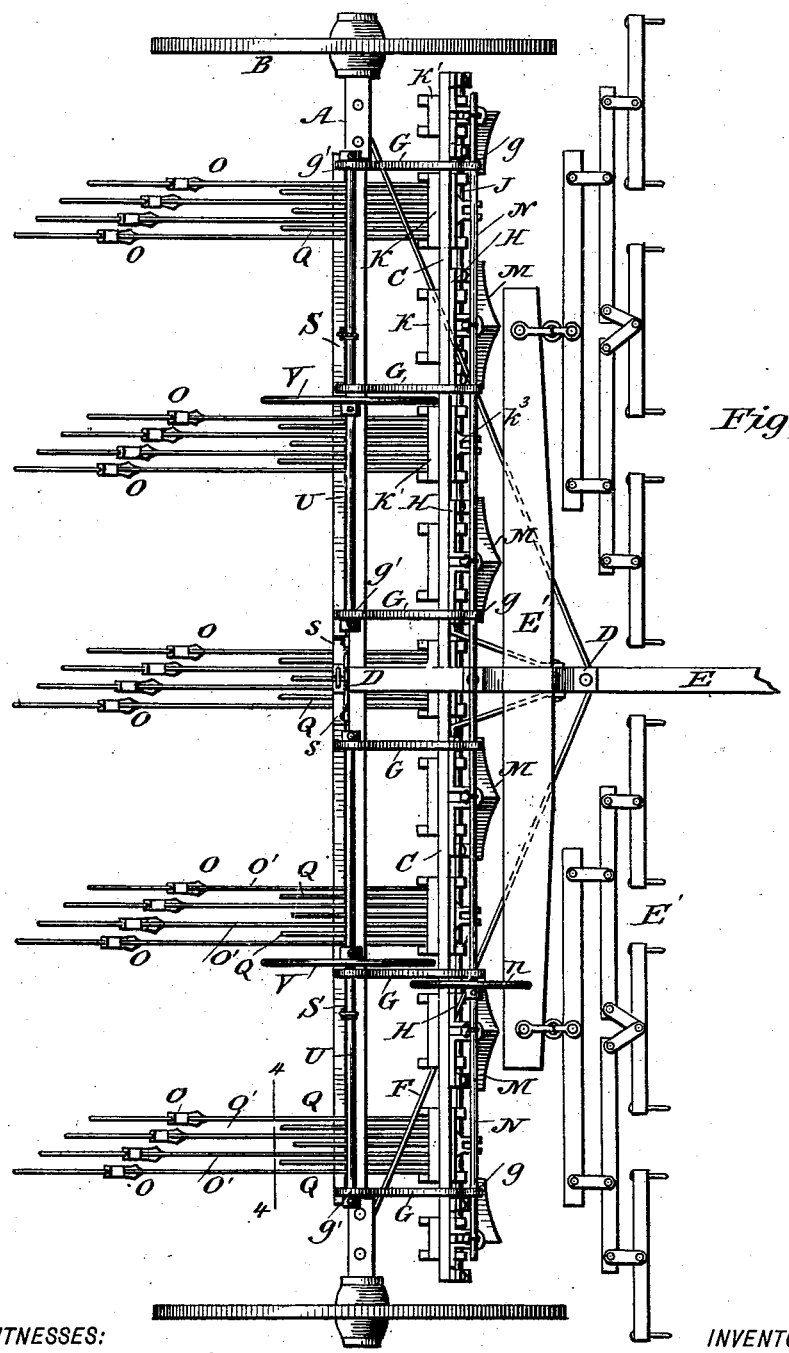

(No Model.)  
2 Sheets—Sheet 1.

H. NEHRMEYER.
COTTON CULTIVATOR.

No. 513,817.  
Patented Jan. 30, 1894.

WITNESSES:  
Fred G. Dieterich  
Jos. A. Ryan

INVENTOR  
Henry Nehrmeyer  
BY Munn & Co.  
ATTORNEYS.

(No Model.) 2 Sheets—Sheet 2.
H. NEHRMEYER.
COTTON CULTIVATOR.
No. 513,817. Patented Jan. 30, 1894.
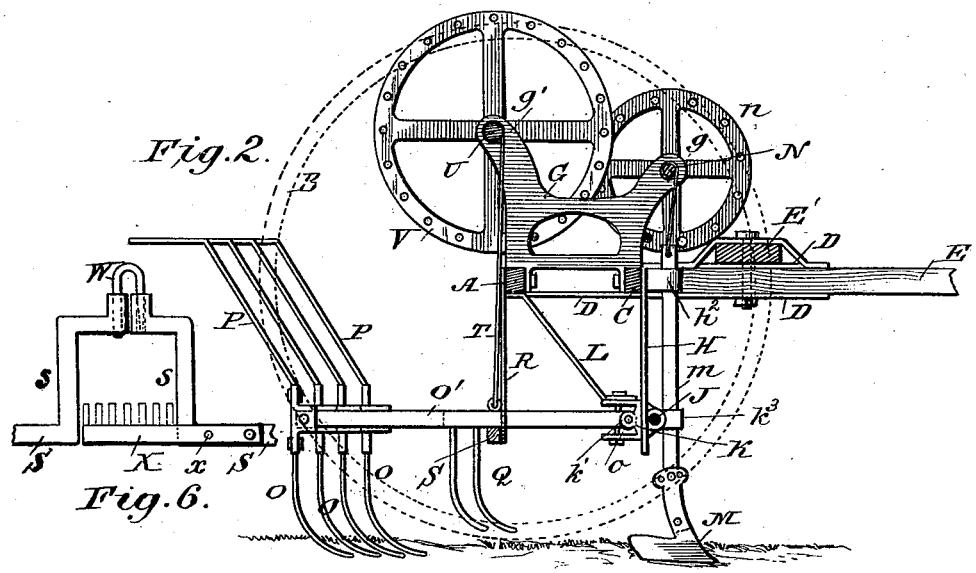
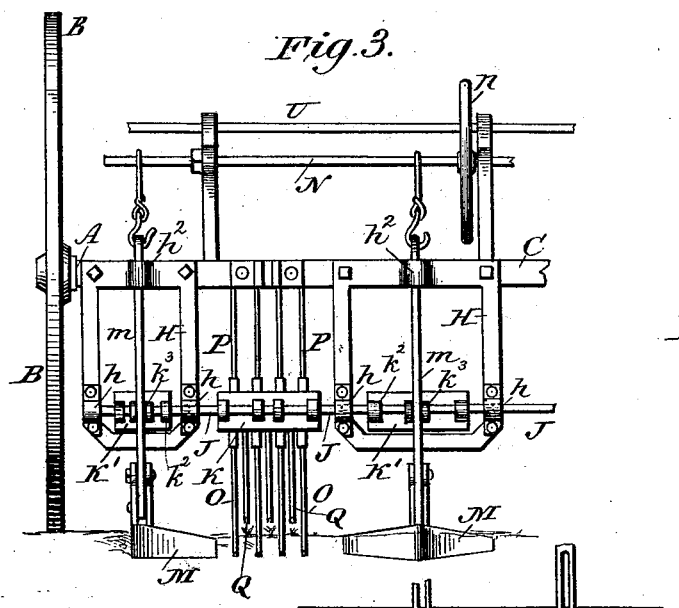
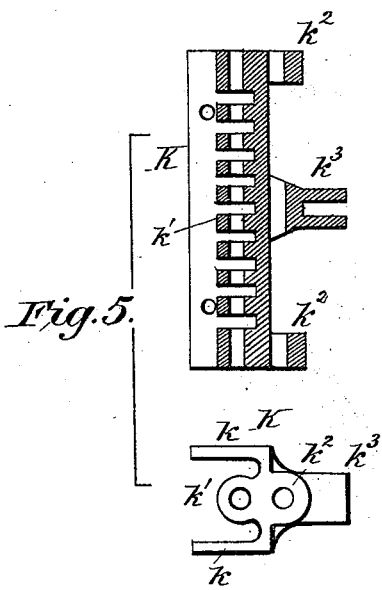
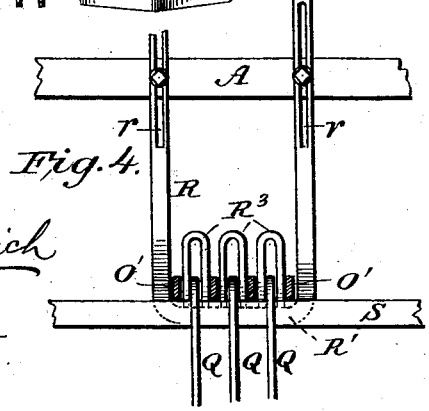
WITNESSES:
Fred G. Dieterich
Jos. A. Ryan
INVENTOR
Henry Nehrmeyer.
BY Munn & Co.
ATTORNEYS.

UNITED STATES PATENT OFFICE.

HENRY NEHRMEYER, OF REINHARDT, TEXAS.

COTTON-CULTIVATOR.

SPECIFICATION forming part of Letters Patent No. 513,817, dated January 30, 1894.

Application filed June 16, 1893. Serial No. 477,862. (No model.)

*To all whom it may concern:*

Be it known that I, HENRY NEHRMEYER, residing at Reinhardt, in the county of Dallas and State of Texas, have invented certain new and useful Improvements in Cotton-Cultivators, of which the following is a specification.

In cultivating cotton it is well known that, while in some cases, the plants will sprout out even thick and uniformly, whereby they can be brought to what is termed a "stand" by the ordinary cultivator plows, it very often happens, owing to the peculiar condition of the soil and weather, that the plant rows sprout out irregular, and then in parts. When they sprout out in the latter manner, great care, much labor and time are required to properly cultivate them to bring them to a proper stand.

To provide means whereby to thin out such irregular growth of plants and bring them to a proper stand, in an effective, quick and economical manner, and whereby five or more stands can be obtained at one operation of the machine is the main object of my invention.

With other objects in view which will be hereinafter referred to, the invention consists in the peculiar combination and novel arrangement of parts, all of which will hereinafter be first described and then be specially pointed out in the claims, reference being had to the accompanying drawings, in which—

Figure 1 is a plan view of my improved cultivator. Fig. 2 is a vertical longitudinal section of the same. Fig. 3 is a partial front elevation of the same. Fig. 4 is a detail section on the line 4—4 Fig. 1. Fig. 5 is an enlarged detail view of one of the connecting boxes hereinafter described, and Fig. 6 is a detail view hereinafter referred to.

Referring to the accompanying drawings A indicates the axle, B the drive wheels, and C a bar, arranged in front of and parallel with the axle A, which is held between a pair of horizontal clip plates D, secured at their rear ends, to the axle, their front ends being projected to receive the tongue E, upon which are mounted the draft trees E', the said bar C being further supported by the diagonal brace bars F secured to the axle and the tongue as clearly shown in Fig. 1.

Projected up from the axle and the bar C is a series of metal frames G, which have bearing portions $g$ $g'$ at their front and rear ends respectively for a purpose hereinafter explained. Projected down from the front of the bar C is a series of inverted yoke frames H, six being shown in the drawings, they being arranged to come between the rows as shown in Fig. 1. At the lower end of the side arms of the said frames H are bearing boxes $h$, in which is held a series of rod sections J, which when set in place serve to form a continuous rod, which forms a bearing for a series of connecting boxes K K', the boxes K being disposed between each pair of frames H while the boxes K' are located between the arms $h'$ of such frames H. These boxes one of which is shown in detail in Fig. 5, consists of upper and lower plates $k$ $k$, between which is a series of rearwardly extending apertured ears $k'$; and on their front faces (at their ends) they have eyes $k^2$, midway of which is an apertured bifurcated lug $k^3$, the several boxes being braced and held rigid by the brace bars L, which connect with the axle A as shown clearly in Fig. 2.

M M indicate a series of main sweep plows secured at the lower ends of standards $m$ held for vertical adjustment in the bifurcated members $k^3$ of the boxes K', and guide portions $h^2$ on the upper ends of the frames H, the upper ends of such standards being connected by flexible connections to a transverse shaft N, journaled in the front bearings $g$ of the frame G, which shaft has a hand wheel $n$, by means of which it can be readily rotated to raise or lower the sweep plows; suitable detent devices such for instance as shown being employed to lock the shaft from turning reversely when desired.

It will be noticed by reference to Fig. 3 that the sweep plows are arranged to travel between the intended stand or rows, the plows having laterally projecting cutter portions, the width of which is governed in accordance with the condition of the plants, in some instances it being necessary to bring them closely up to the intended stand or row. It should be stated however that the end plows have but half sweep sections as shown most clearly in Fig. 3 whereby as the machine returns on its reverse movement, such end plows will serve to cut the half spaces between the rows, the left by the preceding forward operation of the machine. It will be readily understood that by arranging the broad sweep plows to travel between the rows as stated they will serve to thin out the bulk of the plants and leave the blocks or rows between them. At this point it should be stated, that where the crop is thin and uneven, it is necessary after the bulk of cotton is thinned out by the ordinary plows to go over the ground and carefully thin and weed out the standing blocks to bring the cotton to a proper stand. This I accomplish, at the same time that the sweep plows clean out the bulk of the plants. To this end I provide a series of gangs of what I term, finger plows, which are arranged to travel over the intended stand or row sections of the plants, which gangs are adapted to be each operated independently by an operator. These gangs, consist each of a number of plows O O, preferably four arranged as shown most clearly in Fig. 1 the beams of each of which are secured to the ends of bars O' the front ends of which have a hinged connection o with the ears k' on the boxes K their rear ends having upwardly projecting handle members P whereby they can be conveniently manipulated by the operator. In each gang of finger plows are also disposed three clearing fingers Q Q arranged as shown in the drawings, their lower ends being held a short distance above the ground to clear the short plants; such fingers serving as a means of dragging away the weeds or rubbish from in front of the finger plows to leave them free to operate solely to thin out and bring the plants to a perfect stand.

So far as described it will be seen that as the machine is drawn forward and the main sweep plows form as it were the rows, each operator of the several finger plow gangs, will watch his particular row and pick out his plants as the machine drags along, i. e. the finger plows will all cultivate through the row and as they pass along the operator lifts successively such of the plows O in each gang as may come in contact with the particular plant or plants which he wishes to let stand. Thus it will be seen that as the more vigorous plants fall in a sinuous or irregular line, the operator can lift such one of the plows O as may drag in the path of such particular plants.

To provide means whereby the several finger plows can be adjusted so that the operator cannot force them down beyond a predetermined degree, I employ an adjustable frame R for each gang the construction of which is most clearly shown in Fig. 4 of the drawings, by reference to which it will be seen that such bar has its side arms slotted as at r through which pass the bolts which secure them to the axle the lower cross bar R' of such frames R passing under the bars O' as also the bars of the cleaner fingers, which fingers it is manifest will also raise and lower proportionately with the plows O as they are adjusted.

To guide the bars O', I form bail like portions R³ on the cross car R' which extend up between the several arms O' as shown.

The several gangs of finger plows at each side of the center of the main frame, are adapted to be lifted together when it is desired to move such devices out of operative position, and for such purpose, bars S S are held under the several gangs and such bars are supported on flexible connections T secured at their upper ends to shafts U U, mounted in the bearings g' of the supporting frames G, and such shafts have hand wheels V V by means of which they can be rotated to lift the several gang sections at each side together or independently, suitably arranged detent devices in practice being employed to lock the shaft U U from reverse movement, as will be understood from the drawings.

It will be noticed by reference to Fig. 1 that the inner or adjacent ends of the bars S are at a point over the central finger plow gang. To allow for a free vertical movement of such central gang the said ends are bent up as at s s and held together, and guided for independent movement by the guide or bail piece W, as clearly shown in Fig. 6, and one of such bars S has a hinged member X which is adapted to project under the bars of the center finger plow gang, and be held rigid by a bolt x such construction providing means whereby when the several gangs are elevated through the medium of the shaft U U the central gang will be also elevated with them. This central gang it should be stated is also in practice provided with the guide frames R.

Having thus described my invention, what I claim, and desire to secure by Letters Patent, is—

1. A cotton cultivating machine comprising a main frame, a series of opener or weeding plows secured at the front end of such frame, adapted to cut the plants to form the rows, and a series of finger plow gangs arranged to travel between the path of the weeding plows to travel over the rows or intended stand, such gangs formed each of a series of plows having their beams pivotally connected at their front ends to the main frame and their rear ends held for independent vertical movement, all substantially as shown and for the purposes described.

2. In a cotton cultivating machine, in combination, a main frame, having depending members at its front end, connecting boxes secured thereto, a series of weeding plows connected to such front end, a series of gangs of finger plows, arranged to travel between the weeder plow paths, said gangs comprising a series of plows and a series of intermediate clearing fingers having their beams pivotally connected at their front ends to the connecting boxes, the rear ends of the plow beams having handle members, said plow and cleaning finger beams being held for independent vertical movement all arranged substantially as shown and described.

3. In a cotton cultivating machine, the combination with the main frame and a series of furrow opening plows at the front end thereof, of a series of gangs of finger plows, held to travel between the furrows and over the intended stand sections, each gang formed of a series of plows independently operated at their front ends to the main frame, their rear ends held for vertical movement, supporting bars held under the several plow gang beams, and lifting mechanism on the main frame, connected with such bars, whereby all the plow gangs can be raised from operative position all substantially as shown and for the purposes described.

4. In a cotton cultivating machine substantially as described, the combination with the main frame, and the finger plow gangs each consisting of a series of plows having their beams pivoted at their front ends to the main frame, cleaner finger beams held intermediate the plow beams and similarly connected at their front ends to the main frame, adjustable guides secured to the main frame to support the rear ends of the said beams and hold such beams from lateral movement, and lifting means mounted on the main frame and connected with such plow gangs whereby to elevate them when desired all substantially as shown and for the purposes described.

5. In a cotton cultivating machine essentially as described, the combination with the main frame, a series of furrow opener or weeding plows, adjustably held on the main frame, a series of gangs of finger plows held to travel between the furrows made by the front plows, said gangs formed each of a series of plows pivotally secured at their front ends to the main frame, transverse bars held under the several gangs at each side of the center of the frame, the inner or meeting ends bent upward, and guided for vertical movement, a projecting member fitted under the central gang of plows and lifting means located on the main frame, and connected to the aforesaid bars, all arranged substantially as and for the purposes heretofore described.

6. In a cotton cultivator substantially as described, the combination with the main frame, the depending yoke frames secured at the front end of such main frame, the main sweep plows, disposed at such end, and the connecting boxes connected with the yoke frames, of the finger plow gangs arranged to the rear of and intermediate the main sweep plows, each gang formed of a series of plows independently pivoted at their front ends to the aforesaid boxes, a winding shaft on the main frame, and connections between the finger plow gangs and the said shaft, arranged substantially as shown whereby, the several gangs can be elevated together, and each plow in each gang adapted for independent vertical adjustment all substantially as and for the purposes set forth.

HENRY NEHRMEYER.

Witnesses:
FRED G. DIETERICH,
SOLON C. KEMON.